United States Patent

Oishi

[11] Patent Number: 5,958,059
[45] Date of Patent: Sep. 28, 1999

[54] DATA PROCESSING APPARATUS CONNECTABLE TO AN INFORMATION PROCESSING TERMINAL VIA AN INTERFACE

[75] Inventor: Kazuomi Oishi, Yokohama, Japan

[73] Assignee: Canon Kabushiki Kaisha, Tokyo, Japan

[21] Appl. No.: 08/662,948

[22] Filed: Jun. 13, 1996

[30] Foreign Application Priority Data

Jun. 19, 1995 [JP] Japan .................................... 7-151653
May 14, 1996 [JP] Japan .................................... 8-118938

[51] Int. Cl.[6] ...................................................... G06F 1/26
[52] U.S. Cl. ............................. 713/323; 713/324; 710/18
[58] Field of Search ...................... 395/750.05, 750.06, 395/838; 358/442, 468; 713/323, 324; 710/18, 129

[56] References Cited

U.S. PATENT DOCUMENTS

5,041,918  8/1991  Ishida et al. ..................... 379/100.13
5,345,347  9/1994  Hopkins et al. ......................... 360/71
5,530,879  6/1996  Crump et al. ..................... 395/750.05

*Primary Examiner*—Ayaz R. Sheikh
*Assistant Examiner*—Rupal D. Dharia
*Attorney, Agent, or Firm*—Fitzpatrick, Cella, Harper & Scinto

[57] ABSTRACT

In a data processing apparatus connectable to an information processing terminal via an interface, in a power-consumption reduction mode in which electric power supply to a main control unit for controlling communication with the information processing terminal via the interface is interrupted, a request for communication from the information processing terminal is detected. By supplying the main control unit with electric power in response to the detection, the request for communication from the information processing terminal can be accepted even if the apparatus is set to the power-consumption reduction mode in a waiting state.

11 Claims, 8 Drawing Sheets

| | | INITIALI-ZATION | WAITING STATE | DATA TRANSFER REQUEST (PC→PF) | START OF DATA TRANSFER |
|---|---|---|---|---|---|
| PC | Host Logic High | High | High | High | High |
| | nSelectIn | Low | Low | Low | Low |
| | nAutoFd | - | High | High | High |
| | nStrobe | - | High | Low | Low |
| | nInit | Low | High | High | High |
| PERIPHERAL APPARATUS (PF) | Peripheral Logic High | High | High | High | High |
| | PError | - | Low | Low | Low |
| | nAck | - | High | High | High |
| | Busy | - | Low | Low | Low |
| | nFault | - | High | High | High |
| | Select | - | High | High | High |

FIG.6

| | | INITIALI-ZATION | WAITING STATE | REQUEST OF SHIFT TO NEGOTIATION PHASE | START OF NEGOTIATION PHASE |
|---|---|---|---|---|---|
| PC | Host Logic High | High | High | High | High |
| | nSelectIn | Low | Low | High | High |
| | nAutoFd | - | High | Low | Low |
| | nStrobe | - | High | High | High |
| | nInit | Low | High | High | High |
| PERIPHERAL APPARATUS (PF) | Peripheral Logic High | High | High | High | High |
| | PError | - | Low | Low | Low |
| | nAck | - | High | High | High |
| | Busy | - | Low | Low | Low |
| | nFault | - | High | High | High |
| | Select | - | High | High | High |

FIG.7

| | | STATE OF NO PAPER |
|---|---|---|
| PERIPHERAL APPARATUS (PF) | Peripheral Logic High | High |
| | PError | High |
| | nAck | High |
| | Busy | High |
| | nFault | Low |
| | Select | High |

FIG.8

DATA PROCESSING APPARATUS CONNECTABLE TO AN INFORMATION PROCESSING TERMINAL VIA AN INTERFACE

BACKGROUND OF THE INVENTION

1. Field of the Invention

This invention relates to a data processing apparatus connectable to an information processing terminal via an interface.

2. Description of the Related Art

Recently, as the use of information processing terminals, such as personal computers or the like, has become widespread (for the sake of simplification, all such terminals are termed "PC"s), documents are generally formed using a PC. As a result, frequently a facsimile modem is connected to a PC, document data in the PC is directly converted into a facsimile image and the obtained image is transmitted. For that purpose, facsimile apparatuses, copiers, printers and peripheral apparatuses called multi-function apparatuses obtained by combining two or more of the foregoing apparatuses, which provide the same function as the facsimile modem, have been more and more used. The term "data processing apparatus" indicates a peripheral apparatus for such use in the following description.

Some recent PC's have the function of interrupting the electric power supply to a display device or an input/output terminal when there has been no input from a keyboard or a mouse for a certain time period, in order to reduce electric power consumption. The electric power supply for such a PC is, therefore, cut when the PC will not be used for a long time period, for example, at the end of the work day.

When using, for example, a facsimile apparatus as a data processing apparatus (peripheral apparatus), if the facsimile apparatus is set to an automatic reception mode or the like, the power supply of the apparatus is always kept turned on. In some facsimile apparatuses, in order to reduce the electric power consumption in a waiting state, the main power supply of the apparatus (for supplying electric power to respective units including a control unit) is turned off. Instead, the electric power is supplied only to a circuit for detecting call reception from a communication network, or to a circuit for detecting a key input from an operation unit of the apparatus. The main power supply is turned on when some cause for operating the apparatus has been detected.

When connecting a facsimile apparatus having such a power consumption reduction mode to a PC using an ordinary interface, if the facsimile apparatus is set to the power consumption reduction mode, the PC considers the facsimile apparatus to be turned off, and therefore communication (for remote control or the like) between the PC and the facsimile apparatus cannot be performed. If the power consumption reduction mode of the facsimile apparatus is released, communication with the PC can be performed, but the electric power consumption in the waiting state increases. Accordingly, the function (the power consumption reduction mode) of the apparatus cannot be effectively utilized.

SUMMARY OF THE INVENTION

The present invention has been made in consideration of the above-described problems.

It is an object of the present invention to improve a data processing apparatus.

It is another object of the present invention to provide a data processing apparatus, connectable to an information processing terminal via an interface, which can respond to a request for communication from the information processing terminal even if the apparatus is set to a mode of reducing electric power consumption in a waiting state.

According to one aspect, the present invention which achieves these objectives relates to a data processing apparatus connectable to an information processing terminal via an interface, comprising means for setting the interface to a state of being communicatable with the information processing terminal when the apparatus is set to a mode of reducing electric power consumption in a waiting state, and means for supplying respective units of the apparatus with electric power in response to a request for communication from the information processing terminal.

The foregoing and other objects, advantages and features of the present invention will become more apparent from the following detailed description of the preferred embodiments taken in conjuction with the accompanying drawings.

DETAILED DESCRIPTION OF THE PREFERRED EMBODIMENTS

A preferred embodiment of the present invention will now be described in detail with reference to the drawings. In the following embodiment, a description will be provided illustrating a facsimile apparatus as a data processing apparatus (a PC peripheral apparatus).

Figure 1:
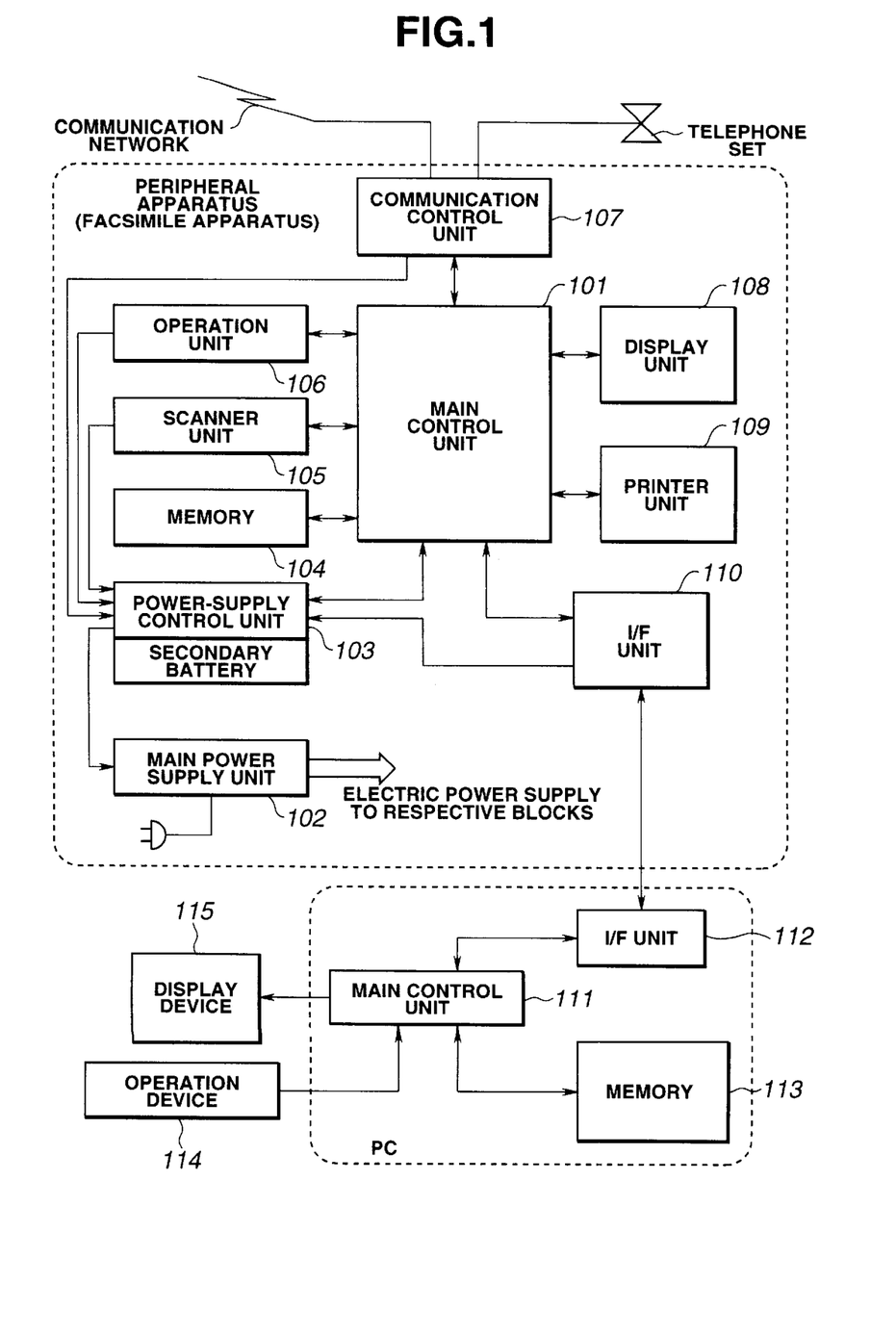
FIG. 1 is a block diagram illustrating the configuration of a system according to an embodiment of the present invention.
Figure 2:
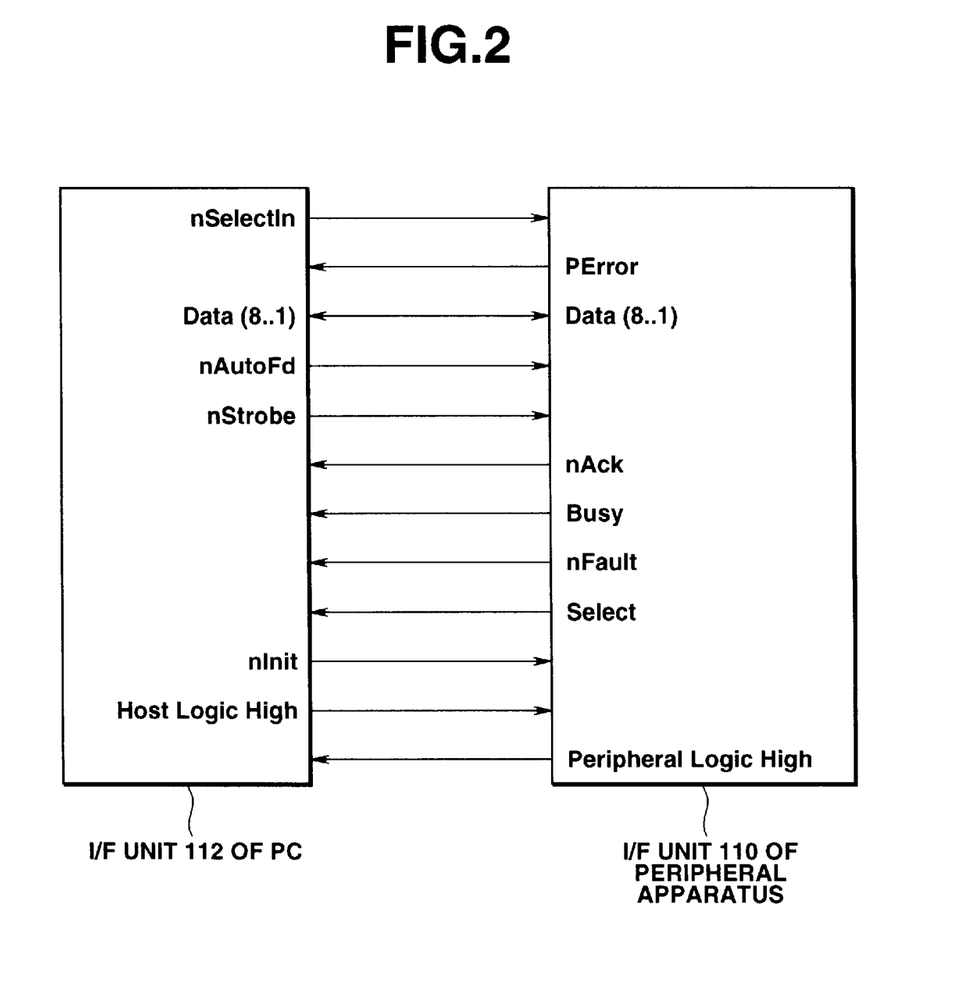
FIG. 2 is a diagram illustrating connection signal lines of an interface.

FIG. 1 is a block diagram illustrating the configuration of a system (comprising a facsimile apparatus and a PC) according to the embodiment. FIG. 2 is a diagram illustrating connection signal lines of an interface (conforming to IEEE 1284) between the facsimile apparatus and the PC.

In FIG. 1, a main control unit 101 comprises a microprocessor, a ROM (read-only memory), a RAM (random access memory) and the like, and controls the operation of the facsimile apparatus.

A main power supply unit 102 supplies the entire facsimile apparatus with electric power.

A power-supply control unit 103 comprises a secondary battery, serving as a sub-power supply, a single-chip microprocessor and the like, and operates with the incorporated sub-power supply (secondary battery) in a waiting state (when the main power supply of the apparatus is turned off). The power-supply control unit 103 checks for a cause for starting the main power supply, and turns on the main power supply unit 102 when a cause for starting the main power supply has been generated. Upon turning on of the main power supply, electric power is supplied to the respective blocks including the main control unit 101. Causes for starting the main power supply comprise a key input signal from an operation unit 106, an original-set signal (a signal indicating setting of an original) from a scanner unit 105, a ringing-signal detection signal (a signal indicating that a ringing signal from a communication network has been detected) from a communication control unit 111, a request signal from the PC via an interface (I/F) unit 110, and the like. When one of these is input to the power-supply control unit 103, the main power supply unit 102 is turned on. In the waiting state, electric power is supplied from the communication network to a ringing-signal detection circuit of the communication control unit 107, and from the sub-power supply (secondary battery) of the power-supply control unit 103 to a key-input detection circuit of the operation unit 106, an original-sensor of the scanner unit 105, and the I/F unit 110.

A memory 104 stores image data and various other kinds of data, and is backed up in the waiting state.

Reference numeral 108 represents a display unit, and reference numeral 109 represents a printer unit.

There are also shown a main control unit 111 of the PC, an interface unit 112 of the PC, a memory 113 of the PC, a keyboard (operation device) 114, and a display device 115, such as a CRT (cathode-ray tube) or the like.

In FIG. 2, the I/F units 110 and 112 can transmit 1-byte data to each other through a bidirectional signal line Data (8..1). Other signal lines have two values, i.e., High and Low.

Figure 5:
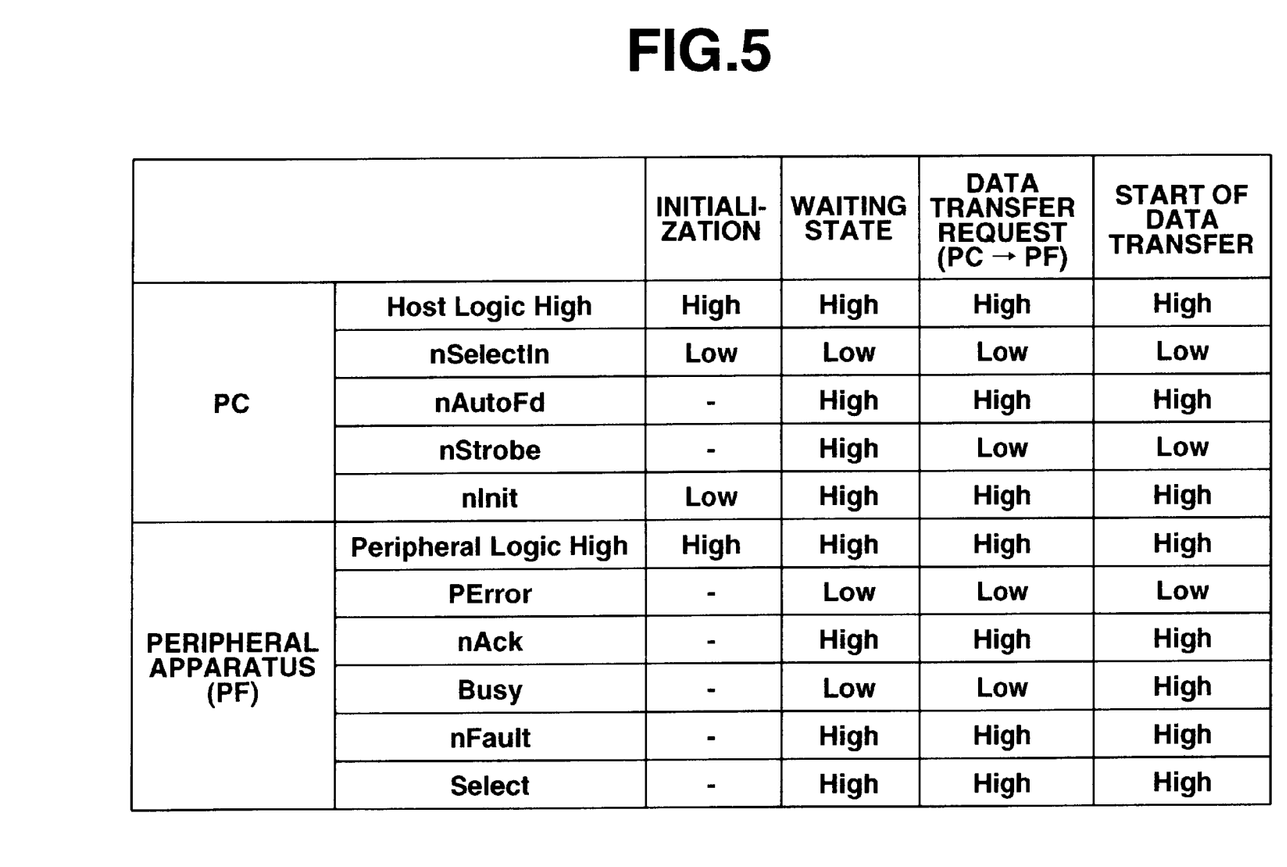
FIG. 5 is a table illustrating respective states of signal lines at initialization, in a waiting state, and at the start of data reception.
Figure 6:
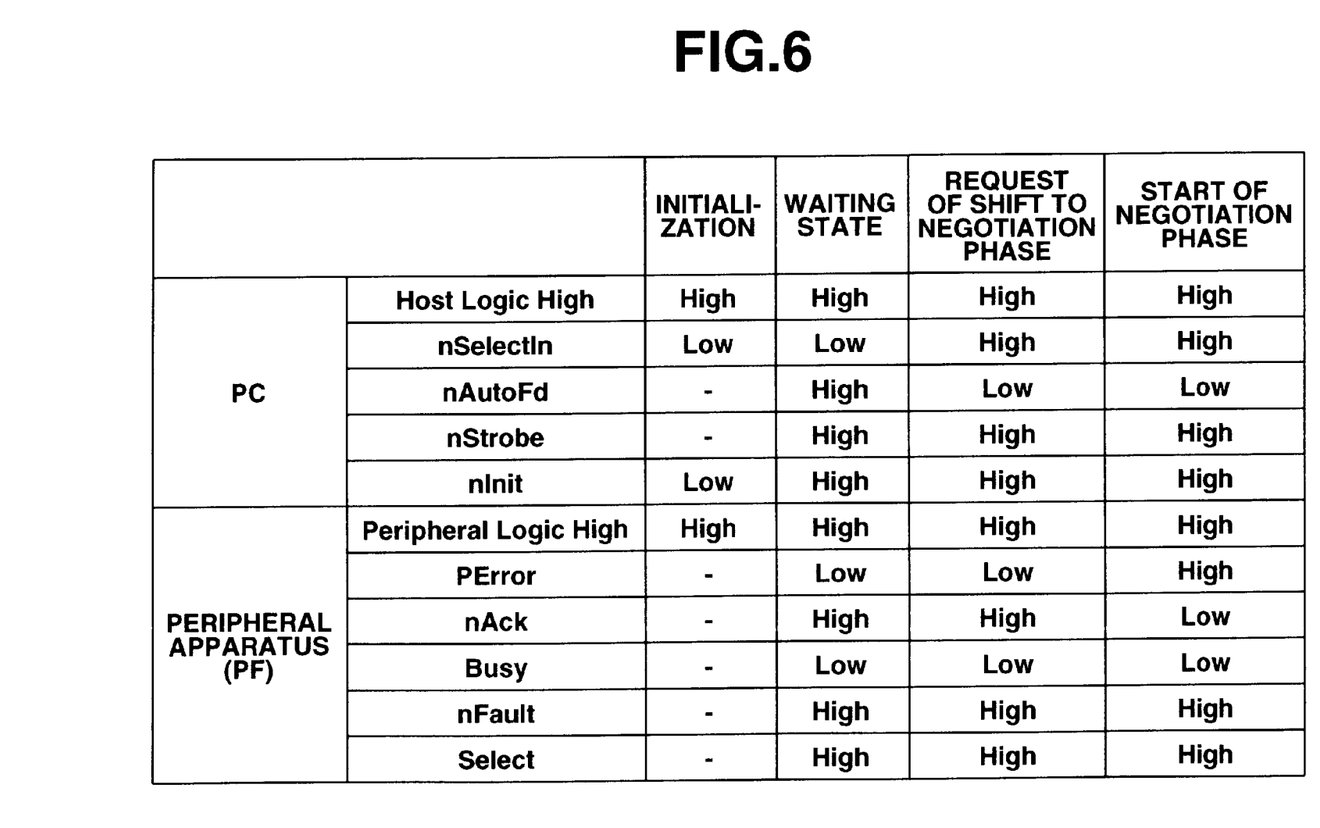
FIG. 6 is a table illustrating respective states of the signal lines at initialization, in a waiting state, and at shift to a negotiation phase.

First, a description will be provided of the basic operation of the interface conforming to IEEE 1284. FIGS. 5 and 6 illustrate the relationship between the states of the PC and the peripheral apparatus and the states of the respective signal lines.

When the power supplies of the PC and the peripheral apparatus are turned on, the signal lines are controlled so as to provide a waiting state (a compatibility mode forward idle phase) through initialization. A shift to a "data transfer" from the PC to the peripheral apparatus (a "compatibility forward data transfer phase") or to a "negotiation phase" can be performed from the waiting state. The negotation phase is a state transfer performed as preprocessing when data transfer is performed in the compatibility mode in an inverse direction from the peripheral apparatus to the PC, such as the transfer of data read by the scanner or received data to the PC.

In order to start data transfer to the peripheral apparatus, the PC sets data on the Data (8..1) line (see FIG. 2), and changes the signal line nStrobe to Low. The peripheral apparatus sets the signal line Busy to High and performs data receiving processing (see FIG. 5). The processing of setting the signal line Busy to High must be performed within 500 nsec, but there is no time limit for data receiving processing thereafter.

In order to shift to the negotiation phase, the PC sets the signal line nSelectIn to High, and changes the signal line nAutoFd to Low. The peripheral apparatus changes signal lines PError and nAck to High and Low, respectively (see FIG. 6). This processing must be performed within 36 msec, and there is a time limit for a series of hand shaking operations to be performed until the negotiation phase is completed.

A description will now be provided of a case in which both the PC and the peripheral apparatus operate. The peripheral apparatus is a facsimile apparatus (see FIG. 1) comprising a scanner unit, printer unit, communication unit, memory, power supply and the like.

1. Turning on the power supply of the peripheral apparatus

Figure 7:
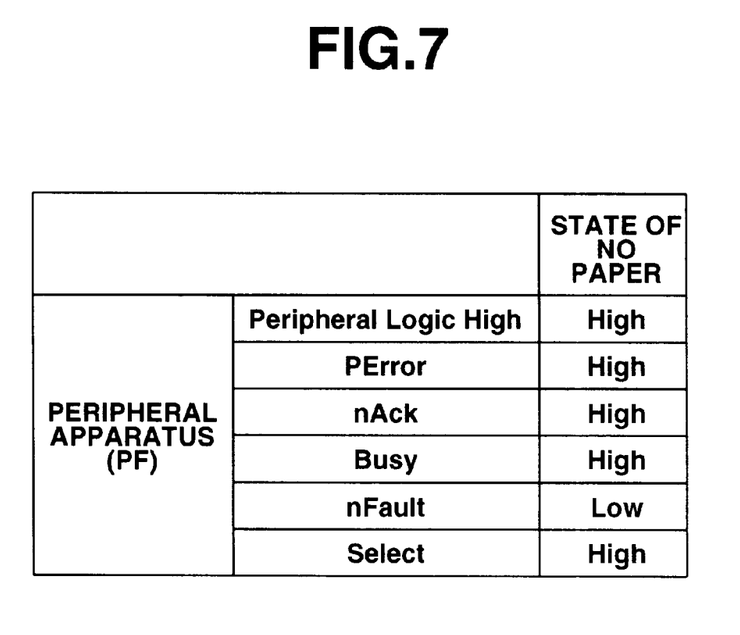
FIG. 7 is a table illustrating the states of signal lines of a peripheral apparatus in a state of no paper.

The main control unit 101 of the peripheral apparatus controls the signal lines so as to have values corresponding to the current state (the waiting state, a state of no paper or the like) by performing processing provided for turning on the power supply (see FIG. 7).

2. Turning on the power supply of the PC

The main control unit 111 of the PC controls the signal lines so as to have values corresponding to the current state by performing processing provided for turning on the power supply.

3. Power-saving state

Figure 3:
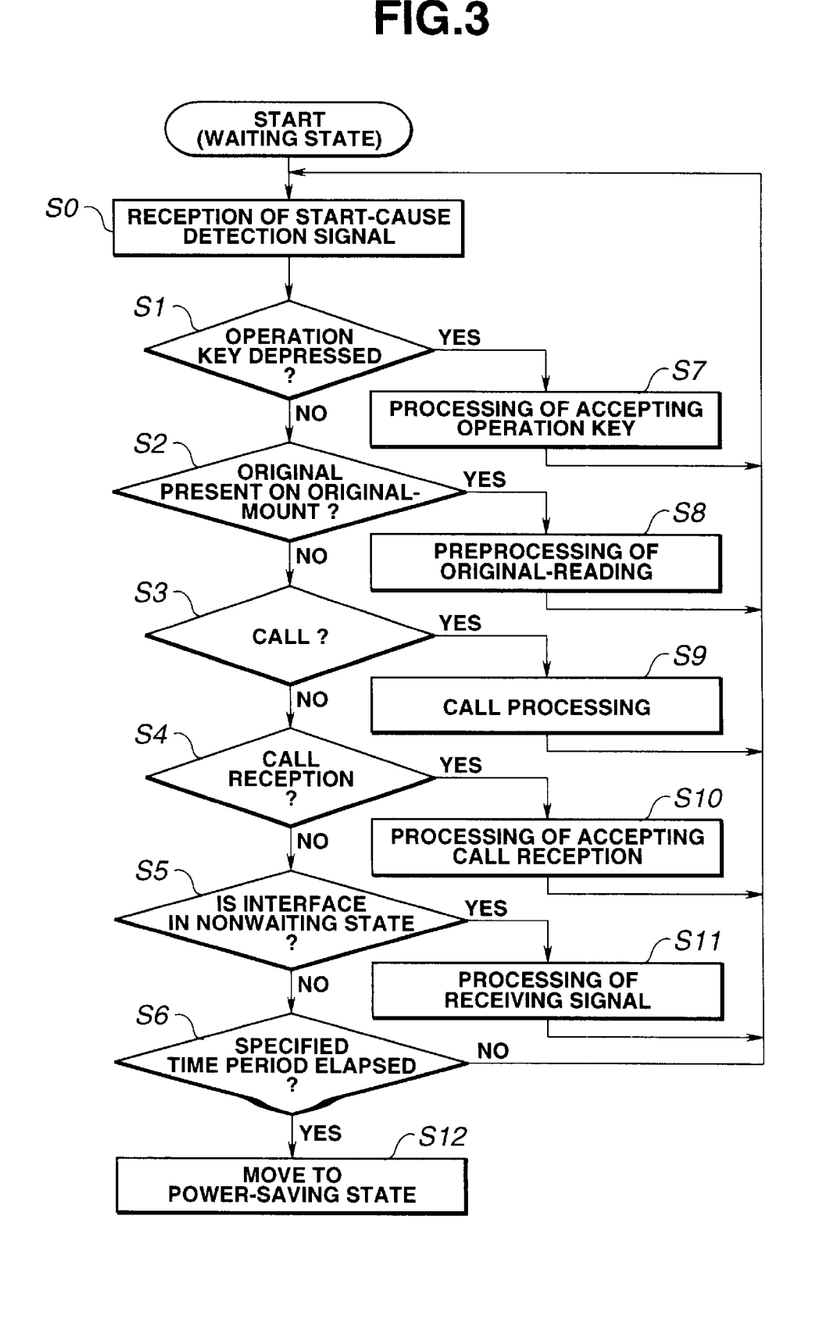
FIG. 3 is a flowchart illustrating the control operation of a main control unit 101 shown in FIG. 1.

The PC and the peripheral apparatus continue the waiting state unless there is a state transition. The facsimile apparatus, serving as the peripheral apparatus, accepts at any time the user's instruction entered by depressing an operation key, insertion of an original into the original-reading device of the apparatus, a call to the network, or call reception from the network. However, when the waiting state has continued for a specified time period during which none of these events occurs, the peripheral apparatus moves to a state of reducing electric power consumption (this state will be hereinafter termed the "power-saving state") without changing the values of the respective signal lines (the values in the waiting state). The respective signal lines maintain the values in the waiting state because a change in the values would result in a determination by the PC that the peripheral apparatus is not in the waiting state. In such a case, the user would have to go to the peripheral apparatus and initialize it. FIG. 3 is a flowchart illustrating the operation for a shift from the waiting state to the power-saving state. In the power-saving state, for example, the electric power supply to analog circuits and the supply of a clock signal to peripheral digital circuits are interrupted, and even the supply of a clock signal to the main control unit 101 (CPU) is also interrupted. In the present embodiment, a description will be provided of a case in which electric power is supplied from the power-supply control unit 103 to the I/F unit 110 and to respective circuits for detecting changes in the voltages of the signal lines of the interface, depression of the operation key, the presence of an original, the occurrence of a call and call reception, but electric power is not supplied to other circuits. Since electric power is supplied to the I/F unit 110, the respective signal lines can maintain their values for the waiting state. Since electric power is not supplied to almost all other circuits, a state of considerably reduced electric power consumption is realized.

4. Start of data transfer from the power-saving state

Figure 4:
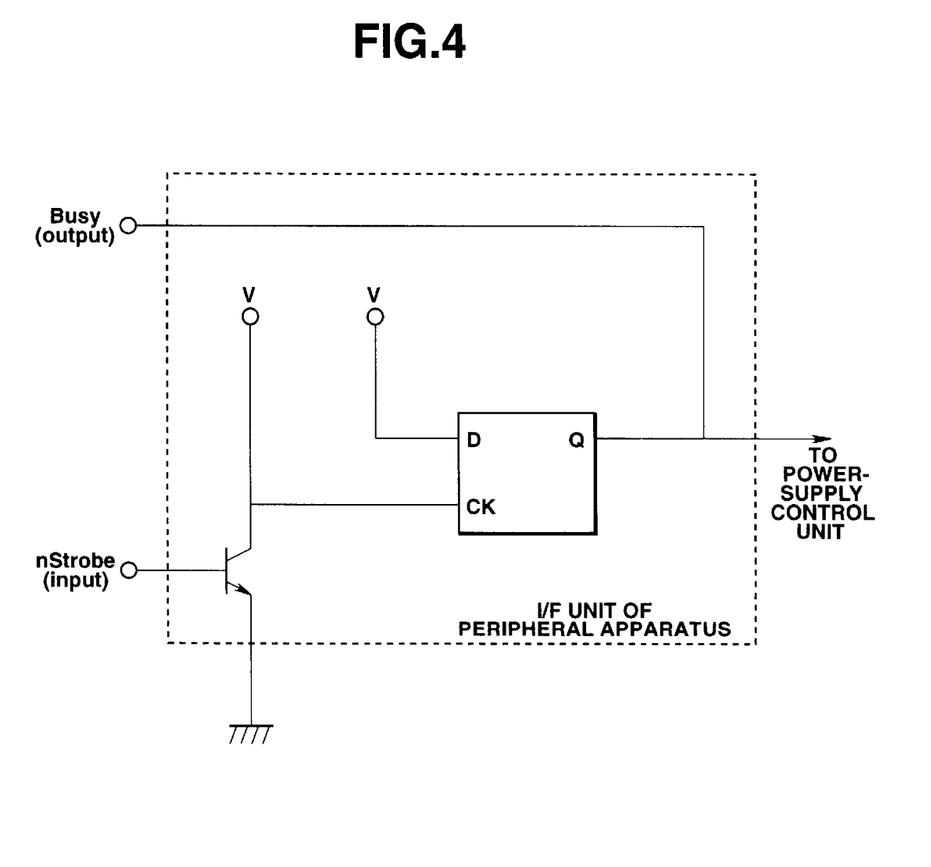
FIG. 4 is a schematic diagram illustrating a configuration for automatically generating a High state signal both to a PC as a Busy output and to a power supply control unit 103 in response to a change (from High to Low) of the nStrobe input from the PC in FIG. 1.

When the PC requests the peripheral apparatus to perform data transfer, the signal line nStrobe changes from High to Low. In response to this change, the peripheral apparatus must change the signal line Busy from Low to High within 500 nsec according to the provisions of IEEE 1284. However, if it is intended to control the signal line Busy after performing processing, comprising turning on the power supply of the peripheral apparatus, starting the CPU, initialization and the like, by using the change of the signal line nStrobe from High to Low as a trigger, it is difficult to complete such processing within 500 nsec. Accordingly, when the signal line nStrobe goes from High to Low in the peripheral apparatus in the power-saving state, it is necessary to begin the processing, comprising turning on the power supply of the peripheral apparatus, initialization and the like, while making the signal line Busy go from Low to High within 500 nsec, and to receive data after this processing has been normally completed. FIG. 4 illustrates a circuit for that purpose, which responds to the change in the nStrobe signal from the PC, automatically generates a High state of the Busy signal using a transistor and a D flip-flop circuit, and also transmits a signal High requesting the power-supply control unit 103 to start the main power supply. The power-supply control unit 103 restores electric power supply to the main power supply 102 in response to the signal High from the I/F unit 110.

5. Shift from the power-saving state to the negotiation phase

When the PC requests the peripheral apparatus to shift to the negotiation phase, the signal lines nSelectIn and nAutoFd change from Low to High and from High to Low, respectively. For this change, the peripheral apparatus must change the signal lines PError and nAck to High and Low, respectively, within 35 msec according to the provisions of IEEE HV1284. In contrast to the response to the change of the signal line nStrobe from High to Low during data transfer, since it is only necessary to respond to the request for a shift to the negotiation phase within 35 msec, this time period is sufficient for the processing, comprising turning on the power supply of the peripheral apparatus, starting the main control unit 101 (CPU), initialization and the like. That is, the change of the signal line nSelectIn from Low to High, serving as a request to shift to the negotiation phase, is detected, and an operation of returning from the power-saving state is started by using the detection as a trigger.

6. Power-saving state

The PC and the peripheral apparatus, after having completed the data transfer processing or the processing after the shift to the negotiation phase, shift to the power-saving state according to the flowchart shown in FIG. 3.

Figure 8:
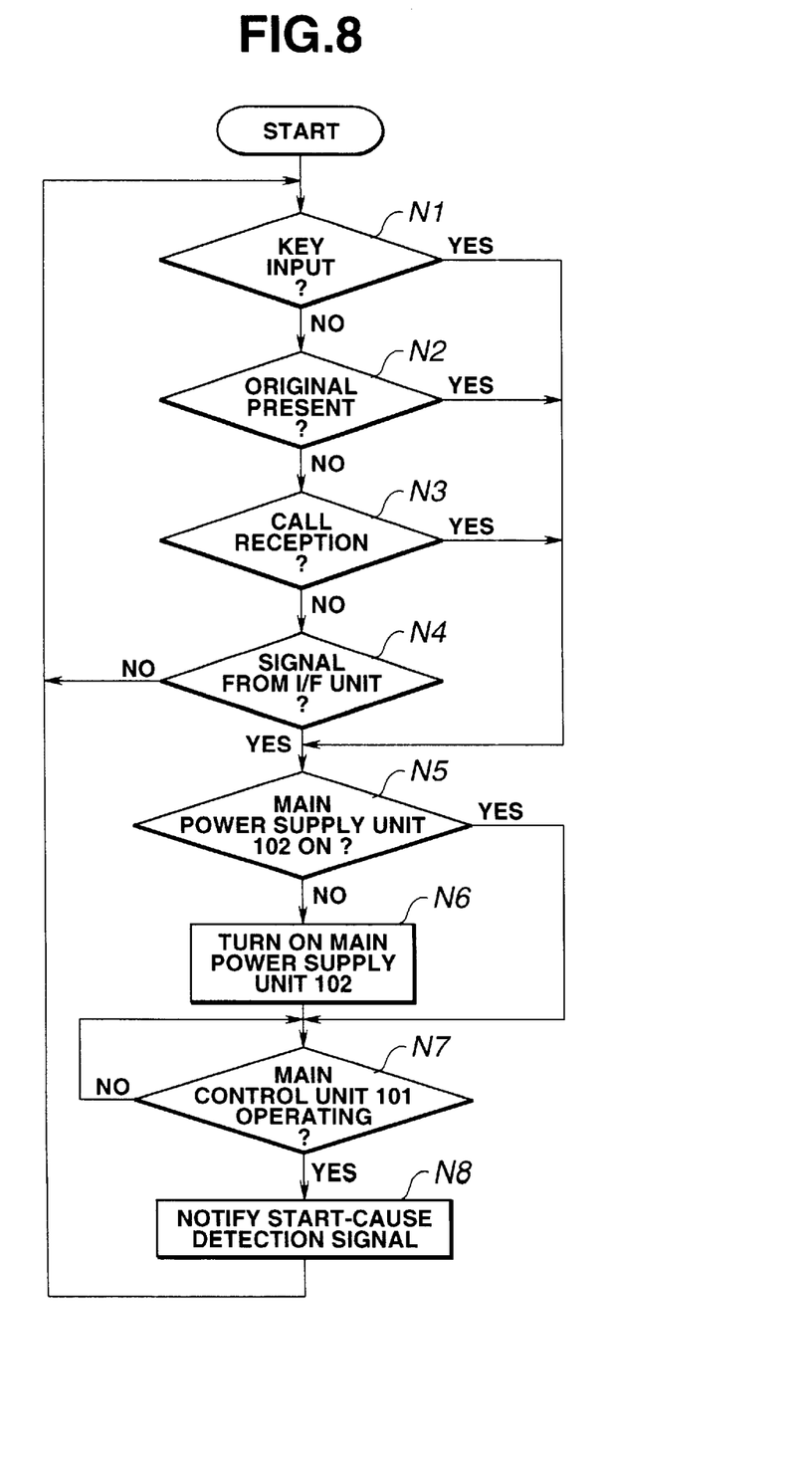
FIG. 8 is a flowchart illustrating the control operation of a power-supply control unit 103 shown in FIG. 1.

The microprocessor of the power-supply control unit 103 of the facsimile apparatus executes the flow shown in FIG. 8. When the main power supply unit 102 is turned on by the power-supply control unit 103 to supply electric power, the main control unit 101 executes the flow shown in FIG. 3.

First, the control operation of the power-supply control unit 103 will be described.

In steps N1, N2, N3 and N4 shown in FIG. 8, a key input is determined based on a key-input signal from the operation unit 106, the presence of an original is determined based on a signal from an original sensor of the scanner unit 105, call reception from the communication network is determined based on a signal from a ringing-signal detection circuit of the communication control unit 107, and it is determined based on a signal from the I/F unit 110 whether or not the interface has entered a nonwaiting state, respectively. If the result of the determination in at least one of steps N1–N4 is affirmative, the process proceeds to step N5, where it is determined if the main power supply unit 102 is turned on. If the result of the determination in step N5 is negative, the process proceeds to step N6, where the main power supply unit 102 is turned on, and the proecess then proceeds to step N7. If the result of the determination in step N5 is affirmative, the process proceeds to step N7.

When it has been determined in step N7 that the main control unit 101 is in an operating state, the process proceeds to step N8, where the cause for starting detected in any one of the steps N1–N4 is notified to the main control unit 101, and the process returns to step N1.

When electric power supply to the respective units of the apparatus including the main control unit 101 has been started by turning on the main power supply 102 by the power-supply control unit 103, the main control unit 101 executes the flow shown in FIG. 3.

First, the main control unit 101 performs initialization (initial reset), and receives in step S0 information relating to the cause for starting from the power-supply control unit 103. Then, the main control unit 101 determines the cause for starting the main power supply in steps S1, S2, S4 and S5. The cause for starting the main power supply is notified in step S0 from the single-chip microprocessor of the power-supply control unit 103. In step S1, the presence of a key-input signal is determined. In step S2, the setting of an original on an original-mount of the scanner unit 105 is determined. In step S4, the occurrence of call reception (the presence of a ringing-signal detection signal) is determined. In step S5, the presence of a signal from the I/F unit 110 (whether or not the interface is in a nonwaiting state) is determined.

If the result of the determination in step S1 is affirmative, the process proceeds to step S7, where input processing of the key of the operation unit 106 is executed. If the result of the determination in step S2 is affirmative, the process proceeds to step S8, where preprocessing for reading the set original (preparation of lighting of the exposure lamp of the scanner unit 106, sheet conveying processing and the like) is executed.

In step S3, the presence of an instruction for a call (whether or not a call or transmission has been instructed by a key input in step S7) is determined. If the result of the determination in step S3 is affirmative, the process proceeds to step S9, where call processing (or transmission processing) is executed.

If the result of the determination in step S4 is affirmative, the process proceeds to step S10, where processing for accepting call reception (call receiving processing and the like) is performed. If the result of the determination in step S5 is affirmative, the process proceeds to step S11, where processing for receiving a signal from the PC is executed.

If the results of the determination in steps S1–S5 are all negative, the process proceeds to step S6, where it is determined whether or not a predetermined time period (specified time period) has elapsed from the end of execution of the processing of any one of steps S7–S11. If the result of the determination in step S6 is negative, the process returns to step S1. If the result of the determination in step S6 is affirmative, the process proceeds to step S12, where the apparatus shifts to the power-saving state by turning off the main power supply 102.

In addition to the above-described power-saving mode, the facsimile apparatus has an ordinary mode of supplying the main control unit 101 with electric power even during the waiting state and supplying the scanner unit, the printer unit and the like with electric power whenever necessary by controlling the main power supply unit 102 by the control of the main control unit 101. The operator selects one of the power-saving mode and the ordinary mode by a key input through the operation unit 106.

As can be understood from the foregoing description, electric power consumption is reduced by placing the peripheral apparatus in the power-saving state when data transfer is not performed, and the peripheral apparatus returns to an ordinary state when performing data transfer from the PC to the peripheral apparatus. In general, a series of consecutive data are intermittently transferred from the PC to the peripheral apparatus. For example, each document is printed at an interval of several tens of minutes or is transmitted through facsimile communication. Accordingly, transfer of consecutive data and subsequent processing for the data can be promptly performed in an ordinary state. Since the power-saving state is active for most of time wherein data is not being transferred, electric power consumption can be reduced without causing inconvenience for the user.

Other Embodiments

When the peripheral apparatus comprises a printer, the printer shifts to a power-saving state when a state in which an operation key of the printer is not depressed or a waiting state of the interface continues for more than a specified time period. In contrast to the case of the facsimile apparatus, in the energy-saving state, electric power may be supplied only to a unit for monitoring a change in the voltages of signal lines of an interface unit with the PC. This is because, in the case of the printer, it is necessary to start a printer unit only when data is transmitted from the PC. As in the above-described embodiment, a request for data transfer from the PC is performed by making the signal line nStrobe go from High to Low. In response to this request, the signal line Busy is changed from Low to High via the circuit shown in FIG. 4, and processing, comprising turning on the power supply of the printer, initialization and the like, is performed.

When the peripheral apparatus comprises a scanner, when a state in which an operation key of the scanner is not depressed, a waiting state of the interface, or a state of no original continues for more than a specified time period, the scanner shifts to a power-saving state. In the power-saving state, electric power is supplied only to units for detecting the occurrence of depression of an operation key of the scanner, the presence of an original and a change in the voltages of signal lines of the interface, but electric power is not supplied to other units. When any one of the above-described events is detected, a returning operation is started. In the case of the scanner, since data transfer is performed from a scanner unit to the PC, the negotiation phase is executed. Accordingly, as in the case of the facsimile apparatus, a returning operation can be started by detecting a change from Low to High in the signal line nSelectIn of the interface.

When the peripheral apparatus comprises a communication apparatus, when a state in which an operation key of the communication apparatus is not depressed, a waiting state of an interface, or a state of no call reception continues for more than a specified time period, the apparatus shifts to the power-saving state. In the power-saving state, electric power is supplied only to units for detecting the occurrence of depression of an operation key, the occurrence of call reception and a change in the voltages of signal lines of the interface, but electric power is not supplied to other units. When any one of the above-described events is detected, a returning operation is started. A method for detecting a change in the signals of the interface is the same as in the case of the facsimile apparatus.

As described above, by shifting to a power-saving state or returning to a waiting state by detecting a characteristic state of the apparatus, a power-saving state and a waiting state which are most suitable for the apparatus can be realized.

The individual components designated by blocks in the drawings are all well known in the data processing apparatus arts and their specific construction and operation are not critical to the operation or the best mode for carrying out the invention.

While the present invention has been described with respect to what are presently considered to be the preferred embodiments, it is to be understood that the invention is not limited to the disclosed embodiments. To the contrary, the present invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A data processing terminal apparatus connected to an information processing terminal via an interface and being operable independently of the information processing terminal, said apparatus comprising:

said apparatus being connected to the interface by signal lines;

means for maintaining waiting state values on said signal lines for setting the interface to a state of being able to communicate with the information processing terminal while said apparatus is set to a mode of reducing electric power consumption in a waiting state; and means for supplying necessary units of said apparatus with electric power in response to a request for communication from the information processing terminal, whereby said interface performs communication by changing voltages on the signal lines, said apparatus further comprising detection means for detecting a change in the voltage of a predetermined signal line of the interface, said electric-power supply means being arranged to supply electric power when said detection means detects a change in the voltage on the predetermined signal line.

2. An apparatus according to claim 1, further comprising means for changing the voltages on others of the signal lines in response to detection of a change in the voltage on the predetermined signal line.

3. An apparatus according to claim 1, further comprising main control means for controlling at least communication with the information processing terminal via the interface, wherein said electric-power supply means comprises first power supply means capable of being turned on and off for supplying electric power to said main control means, second power supply means for supplying said detection means with electric power in the power-consumption reduction mode, and power-supply control means for turning on said first power supply means in response to a detection by said detection means in the power-consumption reduction mode.

4. A data processing terminal apparatus connected to an information processing terminal via an interface and being operable independently of the information processing terminal, said apparatus comprising:

means for supplying necessary units of said apparatus with electric power in response to a request or communication from the information processing terminal, said apparatus being connected to the interface by signal lines and the interface being constructed and arranged to perform communication by changing voltages on the signal lines;

means for maintaining waiting state values on said signal lines for setting the interface to a state of being able to communicate with the information processing terminal while said apparatus is set to a mode of reducing electric power consumption in a waiting state;

detection means for detecting a change in the voltage of a predetermined signal line of the interface, wherein said electric-power supply means supplies electric power when said detection means detects a change in the voltage on the predetermined signal line;

main control means for controlling at least communication with the information processing terminal via the interface, said electric-power supply means comprising first power supply means capable of being turned on and off for supplying electric power to said main control means;

second power supply means for supplying said detection means with electric power in the power-consumption reduction mode;

power supply control means for turning on said first power supply means in response to a detection by said detection means in the power-consumption reduction mode; and key input means for operating said apparatus, wherein said second power supply means supplies said key input means with electric power in the power-consumption reduction mode, and wherein said power supply control means turns on said first power supply means in response to a key input of said key input means.

5. A data processing terminal apparatus connected to an information processing terminal via an interface and being operable independently of the information processing terminal, said apparatus comprising:

means for supplying necessary units of said apparatus with electric power in response to a request or communication from the information processing terminal, said apparatus being connected to the interface by signal lines and the interface being constructed and arranged to perform communication by changing voltages on the signal lines;

means for maintaining waiting state values on said signal lines for setting the interface to a state of being able to communicate with the information processing terminal while said apparatus is set to a mode of reducing electric power consumption in a waiting state;

detection means for detecting a change in the voltage of a predetermined signal line of the interface, wherein said electric-power supply means supplies electric power when said detection means detects a change in the voltage on the predetermined signal line;

main control means for controlling at least communication with the information processing terminal via the interface, said electric-power supply means comprising first power supply means capable of being turned on and off for supplying electric power to said main control means;

second power supply means for supplying said detection means with electric power in the power-consumption reduction mode;

power supply control means for turning on said first power supply means in response to a detection by said detection means in the power-consumption reduction mode;

reading means for reading an original document; and original document-detection means for detecting the original read by said reading means, wherein said second power supply means supplies said original document-detection means with electric power in the power-consumption reduction mode, and wherein said power supply control means turns on said first power supply means in response to a detection by said original document detection means.

6. An apparatus according to claim 3, further comprising communication means for performing communication via a communication network and ringing-signal detection means for detecting a ringing signal from the communication network, wherein said second power supply means supplies said ringing-signal detection means with electric power in the power-consumption reduction mode, and wherein said power-supply control means turns on said first power supply means in response to a detection by said ringing-signal detection means.

7. An apparatus according to claim 3, wherein said power-supply control means notifies said main control means of a cause for starting the electric power supply.

8. An apparatus according to claim 1, wherein the interface conforms to IEEE 1284.

9. A method for controlling a data processing terminal apparatus which is connected to an information processing terminal via an interface and which is operable independently of the information processing terminal, said method comprising the steps of:

setting the interface to a state of being able to communicate with the information processing terminal when said apparatus is set to a mode of reducing electric power consumption in a waiting state; and supplying necessary units of said apparatus with electric power in response to a request for communication from the information processing terminal, said step of setting the interface to a state of being able to communicate with the information processing terminal apparatus including the step of maintaining waiting state values on signal lines in said interface, and said step of supplying the necessary units of said apparatus with electric power including the step of detecting a voltage change on at least one of said signal lines.

10. A method for controlling a data processing terminal apparatus which is connected to an information processing terminal via an interface and which is operable independently of the information processing terminal, said method comprising the steps of:

setting the interface to a state of being able to communicate with the information processing terminal while said apparatus is set to a mode of reducing electric power consumption in a waiting state;

supplying, from electric-power supply means, necessary units of said apparatus with electric power in response to a request for communication from the information processing terminal;

said apparatus being connected to the interface by signal lines and the interface being constructed and arranged to perform communication by changing voltages on the signal lines;

said step of setting the interface to a state of being able to communicate with the information processing terminal apparatus including a step of maintaining waiting state values on said signal lines, and said step of supplying the necessary units of said apparatus with electric power including a step of detecting a voltage change on at least one of said signal lines;

detecting a change in the voltage of a predetermined signal line of the interface, wherein said step of supplying units of said apparatus with electric power includes the supply of electric power when a change in the voltage on the predetermined signal line is detected;

controlling at least communication with the information processing terminal via the interface;

said electric-power supply means comprising first power supply means capable of being turned on and off for supplying electric power to said main control means;

supplying, from said second power supply means, said detection means with electric power in the power-consumption reduction mode;

turning on said first power supply means in response to a detection by said detection means in the power-consumption reduction mode; and operating said apparatus by key input means, wherein said second power supply means supplies said key input means with electric power in the power-consumption reduction mode, and wherein said power supply control means turns on said first power supply means in response to a key input of said key input means.

11. A method for controlling a data processing terminal apparatus which is connected to an information processing terminal via an interface and which is operable independently of the information processing terminal, said method comprising the steps of:

setting the interface to a state of being able to communicate with the information processing terminal while said apparatus is set to a mode of reducing electric power consumption in a waiting state;

supplying, from an electric-power supply means, necessary units of said apparatus with electric power in response to a request for communication from the information processing terminal;

said apparatus being connected to the interface by signal lines and the interface being constructed and arranged to perform communication by changing voltages on the signal lines;

said step of setting the interface to a state of being able to communicate with the information processing terminal apparatus including a step of maintaining waiting state values on said signal lines, and said step of supplying the necessary units of said apparatus with electric power including a step of detecting a voltage change on at least one of said signal lines;

detecting, by means of detection means, a change in the voltage of a predetermined signal line of the interface, wherein said electric-power supply means supplies electric power upon detection of a change in the voltage on the predetermined signal line;

controlling at least communication with the information processing terminal via the interface, said electric-power supply means comprising first power supply means capable of being turned on and off for supplying electric power to said main control means;

supplying, from second power supply means, said detection means with electric power in the power-consumption reduction mode;

turning on said first power supply means in response to said detecting in the power-consumption reduction mode;

reading an original document; and detecting the original document which has been read, wherein said second power supply means supplies said original document-detection means with electric power in the power-consumption reduction mode, and wherein said power supply control means turns on said first power supply means in response to a detection by said original document detection means.

\* \* \* \* \*

UNITED STATES PATENT AND TRADEMARK OFFICE
CERTIFICATE OF CORRECTION

PATENT NO. : 5,958,059
DATED : September 28, 1999
INVENTOR(S) : KAZUOMI OISHI

It is certified that error appears in the above-identified patent and that said Letters Patent is hereby corrected as shown below:

COLUMN 5:

Line 25, "IEEEHVI284" should read --IEEE1284--; and
Line 63, "proecess" shoud read --process--.

COLUMN 9:

Line 65, "original" should read --original document--.

COLUMN 10:

Line 26, "when" should read --while--;
Line 34, "the" should read --a--; and
Line 37, "the" should read --a--.

Signed and Sealed this

Fifteenth Day of August, 2000

Attest:

Q. TODD DICKINSON

Attesting Officer     Director of Patents and Trademarks